Feb. 9, 1932.  F. W. GAY  1,843,920
MAIN AND AUXILIARY CIRCUITS FOR POWER GENERATORS
Filed Sept. 28, 1928    2 Sheets-Sheet 1

INVENTOR.
FRAZER W. GAY
BY
ATTORNEY

Feb. 9, 1932. F. W. GAY 1,843,920
MAIN AND AUXILIARY CIRCUITS FOR POWER GENERATORS
Filed Sept. 28, 1928 2 Sheets-Sheet 2
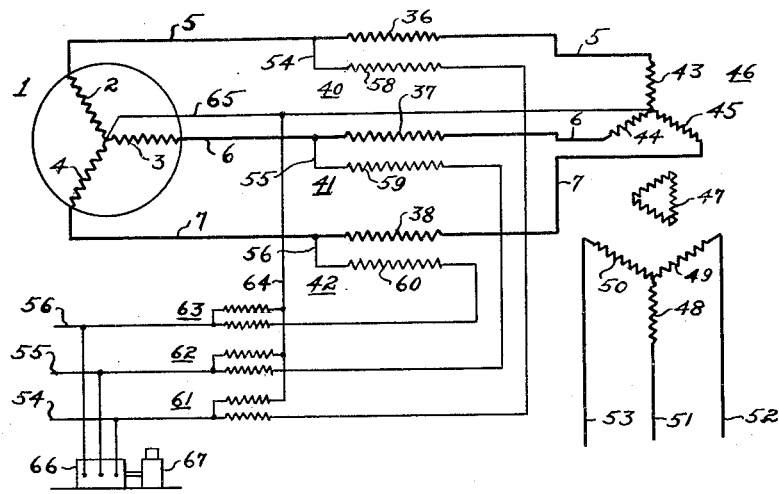
FIG. 3
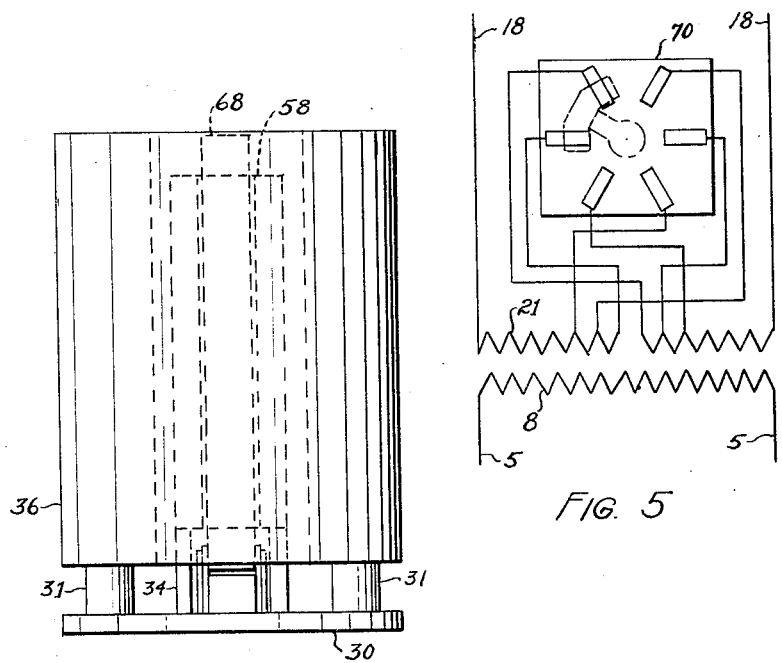
FIG. 4
FIG. 5
INVENTOR.
FRAZER W. GAY
BY
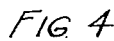
ATTORNEY.

Patented Feb. 9, 1932

1,843,920

UNITED STATES PATENT OFFICE

FRAZER W. GAY, OF NEWARK, NEW JERSEY

MAIN AND AUXILIARY CIRCUITS FOR POWER GENERATORS

Application filed September 28, 1928. Serial No. 309,113.

This invention relates, generally, to electric power generation, and the invention has reference more particularly to a novel arrangement of main and auxiliary power circuits for power generators.

The increase in the size of turbo-generators has been so rapid in recent years that each unit is coming to be considered as a separate power plant and is supplied with its own auxiliary power substation, boilers and other auxiliary equipment. In order to insure a reliable source of power for driving the auxiliary equipment of each turbo-unit, it has been customary to use either a separate small generator directly coupled to the shaft of the large unit or use has been made of a separate generator and turbine. Both of these methods are very expensive. In order to avoid this expense a few installations have been made wherein the auxiliary equipment is supplied with electrical energy taken from the main turbo generator leads. This results in the reliability of the station being greatly lowered owing to the probability of a shut down in the event that the main power bus becomes short circuited, which in such case would cause a loss in voltage on the auxiliary power circuit resulting in the discontinued operation of auxiliary equipment and the consequent forced stoppage of the turbo-generator unit.

An object of this invention is to supply the auxiliary power circuit of a turbo-generator unit from the leads of the unit itself and at the same time provide means for insuring a substantial voltage on the auxiliary power circuit so as to maintain operation of auxiliaries regardless of voltage fluctuations in the main power circuit.

In carrying out the invention, the primary winding of a transformer is placed in series with each of the leads of the turbo-generator and its power load and the secondary winding of such transformer is placed in series with the corresponding phase lead of the auxiliary power circuit. The primary and secondary turns on each such transformer are proportioned or adjusted so that when the generator and its auxiliaries are carrying rated load the ampere turns in the primary will be equal and opposed to the ampere turns in the secondary and the power factor of both loads are adjusted as by a synchronous condenser so as to be equivalent. Under such conditions of operation there is substantially no magnetic flux in the core of each of the series transformers and there will be a low voltage across its terminals. In the event of a short circuit occurring on the main station bus, the voltage of the generator unit will fall to a low value but the high short circuiting current flowing through the primary winding of each transformer will induce a substantial voltage in the secondary winding, thereby maintaining operating voltage upon the auxiliary power circuit during such periods of short circuit of the main load circuit.

Other objects of this invention, not at this time more particularly enumerated, will be clearly understood from the following detailed description of the same.

With the various objects of this invention in view, the same consists, primarily, in the novel construction and arrangement of main and auxiliary power circuits hereinafter set forth; and the invention consists, furthermore, in the novel arrangements and combinations of the various devices and parts, as well as in the details of the construction of the same, all of which will be hereinafter more fully described, and then finally embodied in claims appended hereto.

The invention is clearly illustrated in the accompanying drawings, in which:—

Figure 3 is a diagrammatic view similar to Figure 1 and illustrates the preferred form of this invention;

Figure 4 is a view similar to Figure 2 and illustrates another form of transformer, and Figure 5 is a diagrammatic view of a tap-changing switch applied to the transformer shown in Figure 2.

Similar characters of reference are employed in all of the hereinabove described views, to indicate corresponding parts.

Figure 1:
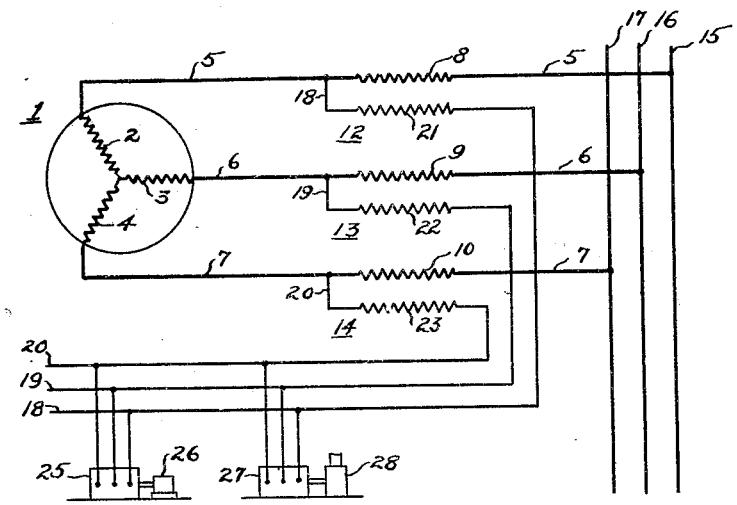
Figure 1 is a diagrammatic view of the novel main and auxiliary power circuit for alternating current generators, embodying the principles of this invention.

Referring now to the said drawings, the reference character 1 indicates a three phase generator having windings 2, 3 and 4. Power leads 5, 6 and 7 connect the windings 2, 3 and 4 respectively to the primary windings 8, 9 and 10 of booster transformers 12, 13 and 14. From the primary windings 8, 9 and 10, the leads 5, 6 and 7 conduct the generator energy to the station bus 15, 16 and 17. Auxiliary power leads 18, 19 and 20 connect with power leads 5, 6 and 7 at points between the generator 1 and the primary windings 8, 9 and 10. The secondary windings 21, 22 and 23 of the transformers 12, 13 and 14 respectively are included in the circuits of the auxiliary power leads 18, 19 and 20. Leads 18, 19 and 20 are adapted to supply electrical energy to the auxiliary power equipment used for maintaining the operation of generator 1. Examples of such auxiliary power equipment may include the synchronous condenser 25 having a direct connected exciter 26 and the induction motor 27 driving a blower 28 for effecting the cooling of the generator 1. Synchronous condenser 25 operates in a manner well known in the art to control the power factor of the auxiliary power circuit 18, 19 and 20 and causes this circuit to have the same power factor as that of the main power circuit 15, 16 and 17.

Figure 2:
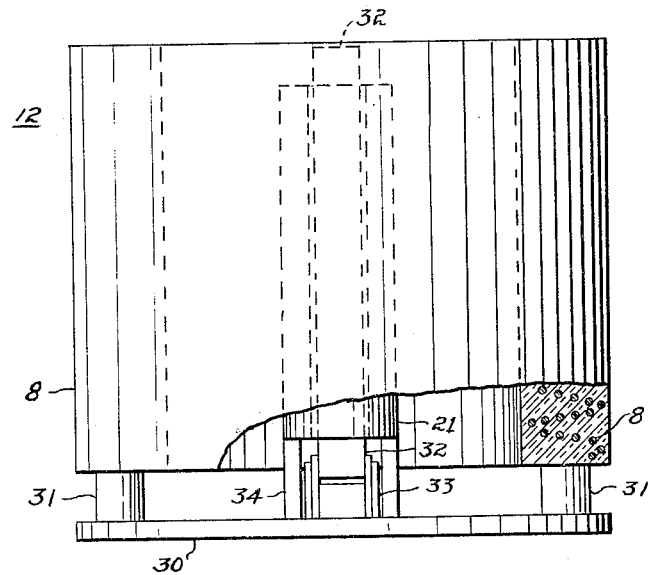
Figure 2 is an enlarged detail view of a transformer employed in carrying out the invention.

The transformers 12, 13 and 14 are preferably of the hedgehog type and are all of the same construction. The use of the hedgehog type of transformer is desirable since small unbalances in primary and secondary magnetomotive forces will produce comparatively slight increments or decrements of voltage in the auxiliary circuit 18, 19 and 20. Since these transformers are similar, only one of them, namely transformer 12, will be described in detail. As shown in Figure 2, transformer 12 comprises a base structure 30 upon which the primary and secondary windings 8 and 21 are mounted. Winding 8 is concentric with winding 21 but is much larger than the latter so that there is a large leakage space between these windings. With this construction, winding 8 serves readily as a generator reactor as well as the primary of the transformer 12. Winding 8 is supported upon insulating blocks 31 secured to the base 30. Winding 21 is closely wound about a stack of magnetic laminations comprising a core 32. Core 32 is mounted upon a pedestal 33, preferably of steel that is secured to the base 30. Winding 21 is supported upon an insulating block 34 secured to the base 30.

The number of secondary turns of the winding 21 is proportioned to the number of primary turns of the winding 8 so that when the generator 1 and its auxiliaries are carrying rated load, the ampere turns on the primary 8 will be equal to and opposed to the ampere turns on the secondary 21. Under these conditions there will be substantially no magnetic flux in the core 32 and there will be a relatively low voltage existing between the corresponding terminals of windings 8 and 21.

In the event of a short circuit occuring across the main power buses 15, 16 and 17, the voltage across these buses will be reduced substantially to zero and an abnormally large current, which may be several times normal, will be drawn from generator 1 through the primary windings 8, 9 and 10. These windings have a relatively high reactance and thereby are adapted to maintain a substantial voltage at the terminals of the generator 1. Assuming a normal field current in the generator 1, the reactance of windings 8, 9 and 10 may be made such as to result in a voltage at the terminals of the generator windings that is substantially twenty-five per cent of normal when the main power bus is short circuited. The voltage on the generator side of the secondaries 21, 22 and 23 will also be twenty-five per cent normal. Inasmuch as the heavy current in windings 8, 9 and 10 is not balanced by a corresponding current in the windings 21, 22 and 23, there will be a large M. M. F. acting on the cores of these transformers. Transformers 8, 9, 10 are so proportioned that with this large M. M. F. their cores will be substantially saturated. The cross section of core 32 is of such dimensions that when this core approaches saturation it will induce a predetermined voltage in the secondaries 21, 22 and 23, for example a voltage equivalent to fifty per cent of the normal voltage of the auxiliary circuit 18, 19 and 20. This voltage is additive to the voltage supplied by the generator 1 so that substantially seventy-five percent of normal voltage is impressed upon the auxiliary circuit 18, 19 and 20 during short circuit of the main bus. This voltage will be sufficient to maintain the auxiliary machinery in operation during the temporary short circuit period, thereby enabling the continuous operation of generator 1. During such short circuit periods, the load current in the auxiliary power circuit will increase only slightly because the power factor of this circuit will improve greatly because the magnetizing current of the auxiliary motors will decrease with the reduced voltage impressed on the circuit and also because the synchronous condenser 25 will increase its leading current and be able to supply substantially all the magnetizing current required by the auxiliary motors.

In the form of the invention illustrated in Figure 3, the power leads 5, 6 and 7 of the generator 1 are connected to the primary windings 36, 37 and 38 of booster transformers 40, 41 and 42. Primary windings 36, 37 and 38 are connected in turn to the primary windings 43, 44 and 45 of a power transformer 46 having a delta connected tertiary winding 47. The secondary windings 48, 49 and 50 of power transformer 46 are connected to the three phase high tension transmission line 51, 52 and 53. The auxiliary power circuit leads 54, 55 and 56 connect with power leads 5, 6 and 7 at points between generator 1 and primaries 36, 37 and 38. The auxiliary power circuit extends through the secondary windings 58, 59 and 60 of transformers 40, 41 and 42. Three standard single phase induction regulators 61, 62 and 63 are illustrated as having their buck and boost coils connected in the auxiliary power circuit 54, 55 and 56. The exciting windings of these induction regulators are each connected at one end by conductor 64 to the neutral lead 65 extending between the generator 1 and primary of transformer bank 46. The other ends of each of these exciting windings are connected to one of the phase leads 54, 55 and 56. Induction regulators 61, 62 and 63 act in a well known manner to maintain desired voltage upon the auxiliary power circuit. Only a single auxiliary motor 66 is illustrated as connected to the auxiliary power circuit 54, 55 and 56, although a plurality of such motors would be employed. Motor 66 is shown driving the blower 67.

The booster transformers 40, 41 and 42 are similar to the corresponding transformers 12, 13 and 14 of Figure 1 with the exception that the primary windings 36, 37 and 38 are positioned close to their corresponding secondary windings resulting in these windings having a relatively low reactance. The windings of transformers 12, 13 and 14 are spaced far apart and their primaries are insulated to act as reactors for withstanding the entire star voltage of the generator in the event of a short circuit of the main generator circuit. Primary windings 36, 37 and 38 however, would ordinarily never be subjected to more than ten percent of the star voltage of the generator owing to the reactance of the power transformer 46. The ampere turns of the secondary windings 58 to 60 is made equal to that of the primary windings 36 to 38 under rated load condition so that under such condition there will be substantially no flux in core 68. In the event of a short circuit of the power leads 51, 52 and 53, the reactance of transformer 46 together with that of primaries 36 to 38 will be sufficient to maintain a substantial voltage at the terminals of generator 1 which voltage for example, may be twenty five percent of normal or even higher. The high current value in the primary windings 36 to 38 will induce in the secondary windings 58 to 60 a voltage that may be fifty percent of normal just as in the case of secondary windings 21 to 23. This induced voltage together with that supplied by the generator 1 will retain the auxiliary circuit voltage at seventy five percent of normal value or even better during the period of short circuit.

It is apparent that the ampere turns of the secondary windings of the booster transformers may readily be made equivalent to that of their corresponding primary windings, while the circuits are operating under rated load conditions, by employing tap-changing switches in connection with such transformers. The tap-changing switches may be connected, for example, in the secondary winding of each of the booster transformers. Figure 5 illustrates such a tap-changing switch 70 mounted in the secondary winding 21.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a generating system, a generator, a main power circuit for said generator, an auxiliary power circuit for said generator, and a transformer having its primary winding of large mean turn diameter in series with said main power circuit and its secondary winding of relatively small mean turn diameter in series with said auxiliary power circuit, said primary winding serving as a reactor for said generator, said transformer being constructed and arranged so that increments of current in said main power circuit above a predetermined value produce increments in voltage in said auxiliary power circuit up to the saturation point of the core of said transformer.

2. In a generating system, a generator, a main power circuit for said generator, an auxiliary power circuit for said generator, a transformer having its primary winding in said main power circuit and its secondary winding in said auxiliary power circuit, and means connected to said secondary winding for maintaining the ampere turns thereof substantially equal to and opposed to the ampere turns of said primary winding under normal load conditions, said transformer being so constructed as to provide a magnetic circuit for said secondary winding of relatively high reluctance, so that during a period of short circuit on said main power circuit, the voltage induced across said secondary winding is maintained at a value that is sufficient to maintain an operating voltage on said auxiliary power circuit.

3. In a generating system, a generator, a main power circuit for said generator, an auxiliary power circuit for said generator, and a transformer having its primary winding of large mean turn diameter in series with said main power circuit and its secondary winding of relatively small mean turn diameter in series with said auxiliary power circuit, said primary winding serving as a reactor for said generator, said transformer being constructed and arranged so that increments of current in said main power circuit above a predetermined value produce increments to voltage in said auxiliary power circuit, said increments in voltage being sufficient to maintain an operating voltage on said auxiliary power circuit.

In testimony, that I claim the invention set forth above I have hereunto set my hand this 27th day of September, 1928.

FRAZER W. GAY.